(12) United States Patent
Chang et al.

(10) Patent No.: US 7,855,244 B2
(45) Date of Patent: *Dec. 21, 2010

(54) FLAME RETARDANT POLYTRIMETHYLENE TEREPHTHALATE COMPOSITION

(75) Inventors: Jing-Chung Chang, Garnet Valley, PA (US); Joseph V. Kurian, Hockessin, DE (US); Yuanfeng Liang, Chadds Ford, PA (US); Joseph P. McKeown, Wilmington, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/834,248

(22) Filed: Aug. 6, 2007

(65) Prior Publication Data

US 2009/0043020 A1 Feb. 12, 2009

(51) Int. Cl.
*C08K 5/3492* (2006.01)
*C08K 3/10* (2006.01)
*C08K 3/22* (2006.01)

(52) U.S. Cl. ...................... 524/101; 524/413

(58) Field of Classification Search ................. 524/100, 524/413, 101
See application file for complete search history.

(56) References Cited

U.S. PATENT DOCUMENTS

| | | | |
|---|---|---|---|
| 2,403,207 A | 7/1946 | Barrick | |
| 4,131,594 A | 12/1978 | Nakamura et al. | |
| 4,203,888 A | 5/1980 | Rashbrook | |
| 5,633,362 A | 5/1997 | Nagarajan et al. | |
| 5,686,276 A | 11/1997 | Laffend et al. | |
| 5,780,534 A | 7/1998 | Kleiner et al. | |
| 5,821,092 A | 10/1998 | Nagarajan et al. | |
| 6,255,371 B1 | 7/2001 | Schlosser et al. | |
| 6,277,947 B1 | 8/2001 | Kelsey et al. | |
| 6,326,456 B2 | 12/2001 | Kelsey et al. | |
| 6,353,062 B1 | 3/2002 | Giardino et al. | |
| 6,365,071 B1 | 4/2002 | Jenewein et al. | |
| 6,538,076 B2 | 3/2003 | Giardino et al. | |
| 6,547,992 B1 | 4/2003 | Schlosser et al. | |
| 6,617,379 B2 * | 9/2003 | Worku et al. ................. 524/100 |
| 6,657,044 B1 | 12/2003 | Kelsey et al. | |
| 7,013,628 B2 | 3/2006 | Howell et al. | |
| 7,038,092 B2 | 5/2006 | Sunkara et al. | |
| 7,084,311 B2 | 8/2006 | Sunkara et al. | |
| 7,098,368 B2 | 8/2006 | Seapan | |
| 2002/0120076 A1 | 8/2002 | Schueler et al. | |
| 2003/0220465 A1 | 11/2003 | Giardino et al. | |
| 2004/0176506 A1 | 9/2004 | Sicken et al. | |
| 2005/0069997 A1 | 3/2005 | Akesson et al. | |
| 2006/0106122 A1 * | 5/2006 | Naito et al. ................. 521/79 |
| 2007/0191580 A1 | 8/2007 | Eng et al. | |
| 2008/0139711 A1 | 6/2008 | Borade et al. | |

FOREIGN PATENT DOCUMENTS

| | | |
|---|---|---|
| DE | 10317487 A1 | 1/2004 |
| EP | 0699708 B1 | 3/1996 |
| EP | 0 955 333 A2 | 10/1999 |
| EP | 0 955 338 A2 | 10/1999 |
| GB | 1 473 369 | 5/1977 |
| JP | HEI 6-157880 | 6/1994 |
| JP | HEI 7-310284 | 11/1995 |
| JP | 2003292754 A | 10/2003 |
| JP | 3115195 U | 9/2005 |
| WO | WO 2006/095337 A2 | 9/2006 |
| WO | 2008061075 A1 | 5/2008 |
| WO | 2008061087 A1 | 5/2008 |

OTHER PUBLICATIONS

Stark et al., Kirk-Othmer Encyclopedia of Chemical Technology, 5th Edition, 2007, pp. 836-920, vol. 26, John Wiley and Sons, Inc.
Hu, L. et al., Synthesis of Perhaloalkanesulfonyl Halides and Their Sulfonimide Derivatives, Inorg. Chem., 1993, pp. 5007-5010, vol. 32.
Conte, L. et al., Perfluoroalkanesulfonylimides and their lithium salts: synthesis and characterisation of intermediates and target compounds, Journal of Fluorine Chemistry, 2004, pp. 243-252, vol. 125, Elsevier B.V.
Quek, S. et al., Synthesis and properties of N,N'-dialkylimidazolium bis(nonafluorobutane-1sulfonyl)imides: a new subfamily of ionic liquids, Tetrahedron, pp. 3137-3145, vol. 26, Elsevier Ltd.
Currie, "Source Apportionment of Atmospheric Particles", Characterization of Environmental Particles, Buffle, et al., Editors, 1 of vol. 1 of the IUPAC Environmental Analytical Chemistry Series (Lewis Publishers, Inc.), 1992, pp. 3-74.
Hoffmann et al., "Heat-Induced Aggregation ofB-Lactoglobulin: Role of the Free Thiol Group and Disulfide Bonds", J. Agric. Food Chem., 1997, 45, pp. 2942-2948.
Hsieh, "Division S-3—Soil Microbiology and Biochemistry—Pool Size and Mean Age of Stable Soil Organic Carbon in Cropland", Soil Sci. Soc., Am. J., vol. 56, Mar.-Apr. 1992, pp. 460-464.
International Search Report Dated Dec. 22, 2008, International Application No. PCT/US2008/072172.

* cited by examiner

*Primary Examiner*—Kriellion A Sanders

(57) ABSTRACT

Improved flame retardant polytrimethylene terephthalate compositions are provided by including a melamine cyanurate flame retardant additive.

9 Claims, No Drawings

FLAME RETARDANT POLYTRIMETHYLENE TEREPHTHALATE COMPOSITION

CROSS-REFERENCE TO RELATED APPLICATIONS

This application is related to commonly owned U.S. application Ser. No. 11/834,232, filed concurrently herewith, entitled "FLAME RETARDANT POLYTRIMETHYLENE TEREPHTHALATE COMPOSITION" (Internal Reference CL3587); commonly owned U.S. application Ser. No. 11/834,260, filed concurrently herewith, entitled "FLAME RETARDANT POLYTRIMETHYLENE TEREPHTHALATE COMPOSITION" (Internal Reference CL3880); commonly owned U.S. application Ser. No. 11/834,279, filed concurrently herewith, entitled "FLAME RETARDANT POLYTRIMETHYLENE TEREPHTHALATE COMPOSITION" (Internal Reference CL3881); and commonly owned U.S. application Ser. No. 11/834,289, filed concurrently herewith, entitled "FLAME RETARDANT POLYTRIMETHYLENE TEREPHTHALATE COMPOSITION" (Internal Reference CL3942).

FIELD OF THE INVENTION

The present invention relates to flame retardant polytrimethylene terephthalate compositions comprising a certain nitrogen-based compound (melamine cyanurates) as a flame retardant additive.

BACKGROUND OF THE INVENTION

Polytrimethylene terephthalate ("PTT") is generally prepared by the polycondensation reaction of 1,3-propanediol with terephthalic acid or terephthalic acid esters. PTT resin, when compared to polyethylene terephthalate ("PET", made with ethylene glycol as opposed to 1,3-propane diol) or polybutylene terephthalate ("PBT", made with 1,4-butane diol as opposed to 1,3-propane diol), is superior in mechanical characteristics, weatherability, heat aging resistance and hydrolysis resistance.

PTT, PET and PBT find use in many application areas (such as carpets, home furnishings, automotive parts and electronic parts) that require a certain level of flame retardance. It is known that PTT in and of itself may, under certain circumstances, have insufficient flame retardance, which currently limits in many of these application areas.

There have been several attempts to improve the flame retardance properties of PTT compositions through the addition of various flame retardant additives. For example, PTT compositions containing halogen-type flame retardants have been widely studied. For example, GB1473369 discloses a resin composition containing polypropylene terephthalate or PBT, decabromodiphenyl ether, antimony trioxide and asbestos. U.S. Pat. No. 4,131,594 discloses a resin composition containing PTT and a graft copolymer halogen-type flame retardant, such as a polycarbonate oligomer of decabromobiphenyl ether or tetrabromobisphenol A, antimony oxide and glass fiber.

Several attempts have been made to prepare halogen-free flame retardant polyester formulations. Processes to make polyesters flame retardant by using halogen-free flame retardants based on P-containing and N-containing compounds are well known. Thus JP-A-06/157880 describes filled polyalkylene terephthalates containing melamine cyanurate and an aromatic phosphate. JP-B-3115195 describes polyesters with N-heterocyclic compounds and a polyfunctional group compound and optionally a P-based flame retardant. U.S. Pat. No. 4,203,888 teaches a polyester with organic diphosphates. However the compositions do not good exhibit good thermal stability especially on prolonged heat aging.

EP-A-0955338, EP-A-0955333 and JP-A-07/310,284 propose PBT resin compositions containing melamine cyanurate, ammonium polyphosphate or melamine polyphosphate, phosphate ester and glass fiber. These compositions, however, have large warpage deformation and a poor appearance when molded, and thus cannot sufficiently satisfy the market's needs.

US2002/0120076A1 describes a polyester molding composition with an improved combination of flowability and mechanical properties. The molding composition comprises from 80 to 99.9 parts by weight of thermoplastic polyester and from 0.1 to 20 parts by weight of a polyamine-polyamide graft copolymer where the total of the parts by weight of the polyester and of the graft copolymer is 100. The polyamine-polyamide graft copolymer is prepared using the following monomers: (a) from 0.5 to 25% by weight, preferably from 1 to 20% by weight, and particularly preferably from 1.5 to 16% by weight, based on the graft copolymer, of a branched polyamine having at least 4 nitrogen atoms, preferably at least 8 nitrogen atoms, and particularly preferably at least 11 nitrogen atoms, and having a number-average molar mass $M_n$ of at least 146 g/mol, preferably of at least 500 g/mol, and particularly preferably of at least 800 g/mol, and (b) polyamide-forming monomers selected from lactams, omega-aminocarboxylic acids, and/or from equimolar combinations of diamine and dicarboxylic acid.

There still is a need to provide PTT compositions with improved flame retardancy properties.

SUMMARY OF THE INVENTION

In accordance with the present invention, it has been found that melamine cyanurates can be blended into PTTs to effectively improve the flame retardancy properties of such PTTs.

The present invention thus provides a PTT-based composition comprising: (a) from about 75 to about 99.9 wt % of a resin component (based on the total composition weight) comprising at least about 70 wt % PTT (based on the weight of the resin component), and (b) from about 0.1 to about 25 wt % of an additive package (based on the total composition weight), wherein the additive package comprises from about 0.1 to about 15 wt % of a melamine cyanurate as a flame retardant additive (based on the total composition weight).

The PTT is of the type made by polycondensation of terephthalic acid or acid equivalent and 1,3-propanediol, with the 1,3-propane diol preferably being of the type that is obtained biochemically from a renewable source ("biologically-derived" 1,3-propanediol).

The invention also relates to a process for preparing a PTT composition with improved flame retardancy, comprising the steps of:

a) providing the melamine cyanurate and the PTT;

b) mixing the PTT and the melamine cyanurate to form a mixture; and c) heating and blending the mixture with agitation to form the composition.

Another aspect of the invention relates to articles (such as fibers, films and molded parts) comprising the PTT composition, such articles having improved flame retardant properties.

Preferably the PTT composition comprises from about 0.5 to about 10 wt %, more preferably from about 2 to about 6 wt % percent, of the melamine cyanurate, based on the total composition weight.

DETAILED DESCRIPTION OF THE PREFERRED EMBODIMENTS

All publications, patent applications, patents and other references mentioned herein, if not otherwise indicated, are explicitly incorporated by reference herein in their entirety for all purposes as if fully set forth.

Unless otherwise defined, all technical and scientific terms used herein have the same meaning as commonly understood by one of ordinary skill in the art to which this invention belongs. In case of conflict, the present specification, including definitions, will control.

Except where expressly noted, trademarks are shown in upper case.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

When the term "about" is used in describing a value or an end-point of a range, the disclosure should be understood to include the specific value or end-point referred to.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition A "or" B is satisfied by any one of the following: A is true (or present) and B is false (or not present), A is false (or not present) and B is true (or present), and both A and B are true (or present).

Use of "a" or "an" are employed to describe elements and components of the invention. This is done merely for convenience and to give a general sense of the invention. This description should be read to include one or at least one and the singular also includes the plural unless it is obvious that it is meant otherwise.

The materials, methods, and examples herein are illustrative only and, except as specifically stated, are not intended to be limiting. Although methods and materials similar or equivalent to those described herein can be used in the practice or testing of the present invention, suitable methods and materials are described herein.

Resin Component

As indicated above, the resin component (and composition as a whole) comprises a predominant amount of a PTT. PTTs suitable for use in the invention are well known in the art, and conveniently prepared by polycondensation of 1,3-propane diol with terephthalic acid or terephthalic acid equivalent.

By "terephthalic acid equivalent" is meant compounds that perform substantially like terephthalic acids in reaction with polymeric glycols and diols, as would be generally recognized by a person of ordinary skill in the relevant art. Terephthalic acid equivalents for the purpose of the present invention include, for example, esters (such as dimethyl terephthalate), and ester-forming derivatives such as acid halides (e.g., acid chlorides) and anhydrides.

Preferred are terephthalic acid and terephthalic acid esters, more preferably the dimethyl ester. Methods for preparation of PTTs are discussed, for example in U.S. Pat. No. 6,277,947, U.S. Pat. No. 6,326,456, U.S. Pat. No. 6,657,044, U.S. Pat. No. 6,353,062, U.S. Pat. No. 6,538,076, US2003/0220465A1 and commonly owned U.S. patent application Ser. No. 11/638,919 (filed 14 Dec. 2006, entitled "Continuous Process for Producing Poly(trimethylene Terephthalate) ").

The 1,3-propanediol for use in making the PTT is preferably obtained biochemically from a renewable source ("biologically-derived" 1,3-propanediol).

A particularly preferred source of 1,3-propanediol is via a fermentation process using a renewable biological source. As an illustrative example of a starting material from a renewable source, biochemical routes to 1,3-propanediol (PDO) have been described that utilize feedstocks produced from biological and renewable resources such as corn feed stock. For example, bacterial strains able to convert glycerol into 1,3-propanediol are found in the species *Klebsiella, Citrobacter, Clostridium*, and *Lactobacillus*. The technique is disclosed in several publications, including previously incorporated U.S. Pat. No. 5,633,362, U.S. Pat. No. 5,686,276 and U.S. Pat. No. 5,821,092. U.S. Pat. No. 5,821,092 discloses, inter alia, a process for the biological production of 1,3-propanediol from glycerol using recombinant organisms. The process incorporates *E. coli* bacteria, transformed with a heterologous pdu diol dehydratase gene, having specificity for 1,2-propanediol. The transformed *E. coli* is grown in the presence of glycerol as a carbon source and 1,3-propanediol is isolated from the growth media. Since both bacteria and yeasts can convert glucose (e.g., corn sugar) or other carbohydrates to glycerol, the processes disclosed in these publications provide a rapid, inexpensive and environmentally responsible source of 1,3-propanediol monomer.

The biologically-derived 1,3-propanediol, such as produced by the processes described and referenced above, contains carbon from the atmospheric carbon dioxide incorporated by plants, which compose the feedstock for the production of the 1,3-propanediol. In this way, the biologically-derived 1,3-propanediol preferred for use in the context of the present invention contains only renewable carbon, and not fossil fuel-based or petroleum-based carbon. The polytrimethylene terephthalate based thereon utilizing the biologically-derived 1,3-propanediol, therefore, has less impact on the environment as the 1,3-propanediol used does not deplete diminishing fossil fuels and, upon degradation, releases carbon back to the atmosphere for use by plants once again. Thus, the compositions of the present invention can be characterized as more natural and having less environmental impact than similar compositions comprising petroleum based diols.

The biologically-derived 1,3-propanediol, and polytrimethylene terephthalate based thereon, may be distinguished from similar compounds produced from a petrochemical source or from fossil fuel carbon by dual carbon-isotopic finger printing. This method usefully distinguishes chemically-identical materials, and apportions carbon material by source (and possibly year) of growth of the biospheric (plant) component. The isotopes, $^{14}C$ and $^{13}C$, bring complementary information to this problem. The radiocarbon dating isotope ($^{14}C$), with its nuclear half life of 5730 years, clearly allows one to apportion specimen carbon between fossil ("dead") and biospheric ("alive") feedstocks (Currie, L. A. "Source Apportionment of Atmospheric Particles," *Characterization of Environmental Particles*, J. Buffle and H. P. van Leeuwen, Eds., 1 of Vol. I of the IUPAC Environmental Analytical Chemistry Series (Lewis Publishers, Inc) (1992) 3-74). The basic assumption in radiocarbon dating is that the constancy of $^{14}C$ concentration in the atmosphere leads to the constancy of $^{14}C$ in living organisms. When dealing with an isolated sample, the age of a sample can be deduced approximately by the relationship:

$$t=(-5730/0.693)\ln(A/A_0)$$

wherein t=age, 5730 years is the half-life of radiocarbon, and A and $A_0$ are the specific $^{14}C$ activity of the sample and of the modern standard, respectively (Hsieh, Y., *Soil Sci. Soc. Am J.*, 56, 460, (1992)). However, because of atmospheric nuclear testing since 1950 and the burning of fossil fuel since 1850, $^{14}C$ has acquired a second, geochemical time characteristic. Its concentration in atmospheric $CO_2$, and hence in the living biosphere, approximately doubled at the peak of nuclear testing, in the mid-1960s. It has since been gradually returning to the steady-state cosmogenic (atmospheric) baseline isotope rate ($^{14}C/^{12}C$) of ca. $1.2\times10^{-12}$, with an approximate relaxation "half-life" of 7-10 years. (This latter half-life must not be taken literally; rather, one must use the detailed atmospheric nuclear input/decay function to trace the variation of atmospheric and biospheric $^{14}C$ since the onset of the nuclear age.) It is this latter biospheric $^{14}C$ time characteristic that holds out the promise of annual dating of recent biospheric carbon. $^{14}C$ can be measured by accelerator mass spectrometry (AMS), with results given in units of "fraction of modern carbon" ($f_M$). $f_M$ is defined by National Institute of Standards and Technology (NIST) Standard Reference Materials (SRMs) 4990B and 4990C, known as oxalic acids standards HOxI and HOxII, respectively. The fundamental definition relates to 0.95 times the $^{14}C/^{12}C$ isotope ratio HOxI (referenced to AD 1950). This is roughly equivalent to decay-corrected pre-Industrial Revolution wood. For the current living biosphere (plant material), $f_M\approx1.1$.

The stable carbon isotope ratio ($^{13}C/^{12}C$) provides a complementary route to source discrimination and apportionment. The $^{13}C/^{12}C$ ratio in a given biosourced material is a consequence of the $^{13}C/^{12}C$ ratio in atmospheric carbon dioxide at the time the carbon dioxide is fixed and also reflects the precise metabolic pathway. Regional variations also occur. Petroleum, $C_3$ plants (the broadleaf), $C_4$ plants (the grasses), and marine carbonates all show significant differences in $^{13}C/^{12}C$ and the corresponding $\delta^{13}C$ values. Furthermore, lipid matter of $C_3$ and $C_4$ plants analyze differently than materials derived from the carbohydrate components of the same plants as a consequence of the metabolic pathway. Within the precision of measurement, $^{13}C$ shows large variations due to isotopic fractionation effects, the most significant of which for the instant invention is the photosynthetic mechanism. The major cause of differences in the carbon isotope ratio in plants is closely associated with differences in the pathway of photosynthetic carbon metabolism in the plants, particularly the reaction occurring during the primary carboxylation, i.e., the initial fixation of atmospheric $CO_2$. Two large classes of vegetation are those that incorporate the "$C_3$" (or Calvin-Benson) photosynthetic cycle and those that incorporate the "$C_4$" (or Hatch-Slack) photosynthetic cycle. $C_3$ plants, such as hardwoods and conifers, are dominant in the temperate climate zones. In $C_3$ plants, the primary $CO_2$ fixation or carboxylation reaction involves the enzyme ribulose-1,5-diphosphate carboxylase and the first stable product is a 3-carbon compound. $C_4$ plants, on the other hand, include such plants as tropical grasses, corn and sugar cane. In $C_4$ plants, an additional carboxylation reaction involving another enzyme, phosphenol-pyruvate carboxylase, is the primary carboxylation reaction. The first stable carbon compound is a 4-carbon acid, which is subsequently decarboxylated. The $CO_2$ thus released is refixed by the $C_3$ cycle.

Both $C_4$ and $C_3$ plants exhibit a range of $^{13}C/^{12}C$ isotopic ratios, but typical values are ca. −10 to −14 per mil ($C_4$) and −21 to −26 per mil ($C_3$) (Weber et al., *J. Agric. Food Chem.*, 45, 2942 (1997)). Coal and petroleum fall generally in this latter range. The $^{13}C$ measurement scale was originally defined by a zero set by pee dee belemnite (PDB) limestone, where values are given in parts per thousand deviations from this material. The "$\delta^{13}C$" values are in parts per thousand (per mil), abbreviated ‰, and are calculated as follows:

$$\delta^{13}C = \frac{(^{13}C/^{12}C)\text{ sample} - (^{13}C/^{12}C)\text{ standard}}{(^{13}C/^{12}C)\text{ standard}} \times 1000\text{‰}$$

Since the PDB reference material (RM) has been exhausted, a series of alternative RMs have been developed in cooperation with the IAEA, USGS, NIST, and other selected international isotope laboratories. Notations for the per mil deviations from PDB is $\delta^{13}C$. Measurements are made on $CO_2$ by high precision stable ratio mass spectrometry (IRMS) on molecular ions of masses 44, 45 and 46.

Biologically-derived 1,3-propanediol, and compositions comprising biologically-derived 1,3-propanediol, therefore, may be completely distinguished from their petrochemical derived counterparts on the basis of $^{14}C$ ($f_M$) and dual carbon-isotopic fingerprinting, indicating new compositions of matter. The ability to distinguish these products is beneficial in tracking these materials in commerce. For example, products comprising both "new" and "old" carbon isotope profiles may be distinguished from products made only of "old" materials. Hence, the instant materials may be followed in commerce on the basis of their unique profile and for the purposes of defining competition, for determining shelf life, and especially for assessing environmental impact.

Preferably the 1,3-propanediol used as a reactant or as a component of the reactant in making PTT will have a purity of greater than about 99%, and more preferably greater than about 99.9%, by weight as determined by gas chromatographic analysis. Particularly preferred are the purified 1,3-propanediols as disclosed in U.S. Pat. No. 7,038,092, U.S. Pat. No. 7,098,368, U.S. Pat. No. 7,084,311 and US20050069997A1.

The purified 1,3-propanediol preferably has the following characteristics:

(1) an ultraviolet absorption at 220 nm of less than about 0.200, and at 250 nm of less than about 0.075, and at 275 nm of less than about 0.075; and/or (2) a composition having a CIELAB "b*" color value of less than about 0.15 (ASTM D6290), and an absorbance at 270 nm of less than about 0.075; and/or (3) a peroxide composition of less than about 10 ppm; and/or (4) a concentration of total organic impurities (organic compounds other than 1,3-propanediol) of less than about 400 ppm, more preferably less than about 300 ppm, and still more preferably less than about 150 ppm, as measured by gas chromatography.

PTTs useful in this invention can be PTT homopolymers (derived substantially from 1,3-propane diol and terephthalic acid and/or equivalent) and copolymers, by themselves or in blends. PTTs used in the invention preferably contain about 70 mole % or more of repeat units derived from 1,3-propane diol and terephalic acid (and/or an equivalent thereof, such as dimethyl terephthalate).

The PTT may contain up to 30 mole % of repeat units made from other diols or diacids. The other diacids include, for example, isophthalic acid, 1,4-cyclohexane dicarboxylic acid, 2,6-naphthalene dicarboxylic acid, 1,3-cyclohexane dicarboxylic acid, succinic acid, glutaric acid, adipic acid, sebacic acid, 1,12-dodecane dioic acid, and the derivatives thereof such as the dimethyl, diethyl, or dipropyl esters of these dicarboxylic acids. The other diols include ethylene glycol, 1,4-butane diol, 1,2-propanediol, diethylene glycol, triethylene glycol, 1,3-butane diol, 1,5-pentane diol, 1,6-hexane diol, 1,2-, 1,3- and 1,4-cyclohexane dimethanol, and the longer chain diols and polyols made by the reaction product of diols or polyols with alkylene oxides.

PTT polymers useful in the present invention may also include functional monomers, for example, up to about 5 mole % of sulfonate compounds useful for imparting cationic dyeability. Specific examples of preferred sulfonate compounds include 5-lithium sulfoisophthalate, 5-sodium sulfoisophthalate, 5-potassium sulfoisophthalate, 4-sodium sulfo-2,6-naphthalenedicarboxylate, tetramethylphosphonium 3,5-dicarboxybenzene sulfonate, tetrabutylphosphonium 3,5-dicarboxybenzene sulfonate, tributyl-methylphosphonium 3,5-dicarboxybenzene sulfonate, tetrabutylphosphonium 2,6-dicarboxynaphthalene-4-sulfonate, tetramethylphosphonium 2,6-dicarboxynapthalene-4-sulfonate, ammonium 3,5-dicarboxybenzene sulfonate, and ester derivatives thereof such as methyl, dimethyl, and the like.

More preferably, the PTTs contain at least about 80 mole %, or at least about 90 mole %, or at least about 95 mole %, or at least about 99 mole %, of repeat units derived from 1,3-propane diol and terephthalic acid (or equivalent). The most preferred polymer is polytrimethylene terephthalate homopolymer (polymer of substantially only 1,3-propane diol and terephthalic acid or equivalent).

The resin component may contain other polymers blended with the PTT such as PET, PBT, a nylon such nylon-6 and/or nylon-6,6, etc., and preferably contains at least about 70 wt %, or at least about 80 wt %, or at least about 90 wt %, or at least about 95 wt %, or at least about 99 wt %, PTT based on the weight of the resin component. In one preferred embodiment, PTT is used without such other polymers.

Additive Package

The PTT-based compositions of the present invention may contain additives such as antioxidants, residual catalyst, delusterants (such as $TiO_2$, zinc sulfide or zinc oxide), colorants (such as dyes), stabilizers, fillers (such as calcium carbonate), antimicrobial agents, antistatic agents, optical brighteners, extenders, processing aids and other functional additives, hereinafter referred to as "chip additives". When used, $TiO_2$ or similar compounds (such as zinc sulfide and zinc oxide) are used as pigments or delusterants in amounts normally used in making PTT compositions, that is up to about 5 wt % or more (based on total composition weight) in making fibers and larger amounts in some other end uses. When used in polymer for fibers and films, $TiO_2$ is added in an amount of preferably at least about 0.01 wt %, more preferably at least about 0.02 wt %, and preferably up to about 5 wt %, more preferably up to about 3 wt %, and most preferably up to about 2 wt % (based on total composition weight).

By "pigment" reference is made to those substances commonly referred to as pigments in the art. Pigments are substances, usually in the form of a dry powder, that impart color to the polymer or article (e.g., chip or fiber). Pigments can be inorganic or organic, and can be natural or synthetic. Generally, pigments are inert (e.g., electronically neutral and do not react with the polymer) and are insoluble or relatively insoluble in the medium to which they are added, in this case the polytrimethylene terephthalate composition. In some instances they can be soluble.

The flame retarding additive used in the compositions of the present invention is a melamine cyanurate, and preferably a non-halogenated melamine cyanurate. Melamine cyanurates are the reaction product of melamine and cyanuric acid, such as disclosed in WO2006/095337. Suitable melamine cyanurates are commercially available, for example, from Apex Chemical Co. (FLAMEPROOF MC-M) and Akzo Nobel NV (FYROL MC). Preferred melamine cyanurates are granular with a particle size of less than about 10 micrometers.

Mixtures of one or more melamine cyanurates, as well as mixtures of one or more melamine cyanurates with one or more other flame retardant additives, are suitable for use in the present invention.

The PTT-based compositions of the invention may be prepared by conventional blending techniques well known to those skilled in the art, e.g. compounding in a polymer extruder, melt blending, etc.

Preferably the resin component and flame retardant additive(s) are melt blended. More specifically they are mixed and heated at a temperature sufficient to form a melt blend, and spun into fibers or formed into shaped articles, preferably in a continuous manner. The ingredients can be formed into a blended composition in many different ways. For instance, they can be (a) heated and mixed simultaneously, (b) pre-mixed in a separate apparatus before heating, or (c) heated and then mixed. The mixing, heating and forming can be carried out by conventional equipment designed for that purpose such as extruders, Banbury mixers or the like. The temperature should be above the melting points of each component but below the lowest decomposition temperature, and accordingly must be adjusted for any particular composition of PTT and flame retardant additive. The temperature is typically in the range of about 180° C. to about 270° C.

The amount of flame retardant additive utilized is preferably from about 0.1 to about 15 wt %, based on total composition weight. More preferably, the amount is from about 0.5 to about 10 wt %, and still more preferably from about 2 to about 6 wt %, based on total composition weight.

Uses

The PTT-based compositions of this invention is useful in fibers, fabrics, films and other useful articles, and methods of making such compositions and articles, as disclosed in a number of the previously incorporated references. They may be used, for example, for producing continuous and cut (e.g., staple) fibers, yarns, and knitted, woven and nonwoven textiles. The fibers may be monocomponent fibers or multicomponent (e.g., bicomponent) fibers, and may have many different shapes and forms. They are useful for textiles and flooring.

A particularly preferred end use of the PTT-based compositions of the invention is in the making of fibers for carpets, such as disclosed in U.S. Pat. No. 7,013,628.

EXAMPLES

In the following examples, all parts, percentages, etc., are by weight unless otherwise indicated.

Ingredients

The PTT used in the examples was SORONA® "semi-bright" polymer available from E.I. du Pont de Nemours and Company (Wilmington, Del.).

The melamine cyanurate additive utilized in the examples was Flameproof MC-M available from Apex Chemical Co. (South Carolina).

The approach to demonstrating flammability improvement was to (1) compound the flame retardant additive into the PTT, (2) cast a film of the modified PTT, and (3) test the flammability of the film to determine the flammability improvement with the flame retardant additive.

Flame Retardant Additive Compounding

SORONA® polymer was dried in a vacuum oven at 120° C. for 16 hours, and flame retardant additive was also dried in a vacuum oven at 80° C. for 16 hours.

Dry polymer was fed at a rate of 18 pounds/hour to the throat of a W & P 30A twin screw extruder (MJM #4, 30 mm screw) with a temperature profile of 190° C. at the first zone to 250° C. at the screw tip and at the one hole strand die (4.76 mm diameter). Dry flame retardant additive was fed to the throat of the extruder at a rate needed to achieve the specified concentration in the polymer, for example, at a rate of 2 pounds/hour to get a 10% loading into polymer. The throat of the extruder was purged with dry nitrogen gas during operation to minimize polymer degradation. The extrusion system was purged with dry polymer for >3 minutes prior to introduction of each flame retardant additive. Unmodified polymer or compounded polymer strand from the 4.76 mm die was cut into pellets for further processing into film.

Film Preparation

All samples were dried at 120° C. for 16 hours before use in preparing films.

Unmodified SORONA® polymer and compounded SORONA® polymer samples were fed to the throat of a W & P 28D twin screw extruder (MGW #3, 28 mm screw). The extruder throat was purged with dry nitrogen during operation to minimize degradation. Zone temperatures ranged from 200° C. at the first zone to 240° C. at the screw tip with a screw speed of 100 rpm. Molten polymer was delivered to the film die, 254 mm wide×4 mm height, to produce a 4 mm thick film, 254 mm wide and up to about 18 meters long. The extruder system was purged with unmodified SORONA® polymer for at least 5 minutes prior to film preparation with each compounded test item.

Test Sample Preparation

For each test item ten test specimens were press cut from the 4 mm thick film using a 51 mm×152 mm die. Five specimens were cut in the film longitudinal (extrusion) direction and five specimens were cut in the transverse (perpendicular to extrusion) direction. Test film specimens were oven dried at 105° C. for greater than 30 minutes followed by cooling in a desiccator for greater than 15 minutes before testing.

Film Flammability Test

A film specimen, 51 mm×152 mm×4 mm, obtained as described above was held at an angle of 45°. A butane flame, 19 mm in length, was applied to the lower, 51-mm width, edge of the film until ignition occurred. After the flame self extinguished, the percent of the film specimen which burned or disappeared was determined and was recorded as percent consumed. The lower the percent consumed result the better the flame retardancy of the additive.

Comparative Example A

Sorona® PTT film with no flame-retardant additive was prepared and tested as described above. With no flame retardant the polymer film was completely consumed by flame without self extinguishing; i.e., 100% consumed.

Example 1

Testing results for Comparative Example A and Example 1 are presented in Table II. As shown, the flame retardant additive improved the flame retardance of polytrimethylene terephthalate, even at low, 2% additive levels.

TABLE 2

| | | % Consumed in Flammability Test | | | |
|---|---|---|---|---|---|
| Ex. | Flame Retardant | 10 wt % Retardant | 5 wt % Retardant | 2 wt % Retardant | 0 wt % Retardant |
| Comp. A | None | | | | 100 |
| 1 | Flameproof MC-M | 9 | 40 | 58 | |

The invention claimed is:

1. A polytrimethylene terephthalate-based composition consisting essentially of: (a) polytrimethylene terephthalate resin, and (b) from about 0.1 to about 15 wt % of a melamine cyanurate flame retardant additive (based on the total composition weight).

2. The polytrimethylene terephthalate-based composition of claim 1, wherein the melamine cyanurate is a non-halogenated melamine cyanurate.

3. The polytrimethylene terephthalate-based composition of claim 1, wherein the melamine cyanurate is granular with an average particle size of less than about 10 micrometers.

4. The polytrimethylene terephthalate-based composition of claim 1 consisting essentially of from about 0.5 to about 10 wt % of a melamine cyanurate (based on total composition weight).

5. The polytrimethylene terephthalate-based composition of claim 1 consisting essentially of from about 2 to about 6 wt % of a melamine cyanurate (based on total composition weight).

6. The polytrimethylene terephthalate-based composition of claim 1, wherein the polytrimethylene terephthalate is of the type made by polycondensation of terephthalic acid or acid equivalent and 1,3-propanediol.

7. The polytrimethylene terephthalate-based composition of claim 1, wherein the polytrimethylene terephthalate is a polytrimethylene phthalate homopolymer.

8. An article made from the polytrimethylene terephthalate-based composition of claim 1.

9. The article of claim 8, that is in the form of a fiber.

* * * * *

UNITED STATES PATENT AND TRADEMARK OFFICE
CERTIFICATE OF CORRECTION

PATENT NO. : 7,855,244 B2  
APPLICATION NO. : 11/834248  
DATED : December 21, 2010  
INVENTOR(S) : Jing-Chung Chang et al.

Page 1 of 1

It is certified that error appears in the above-identified patent and that said Letters Patent is hereby corrected as shown below:

Under the claims: Col. 10 lines 58-60 should read

7. The polytrimethylene terephthalate –based composition of claim 1, wherein the polytrimethylene terephthalate is a polytrimethylene terephthalate homopolymer.

Signed and Sealed this
Fifteenth Day of February, 2011

David J. Kappos
*Director of the United States Patent and Trademark Office*